Patented Oct. 5, 1937

2,094,817

UNITED STATES PATENT OFFICE 2,094,817

AUTOMATIC TURRET LATHE

Fritz Poppensieker, Cologne, Germany

Application May 29, 1936, Serial No. 82,566
In Germany April 18, 1936

7 Claims. (Cl. 29—42)

My invention relates to turret lathes and more especially to the means for driving the longitudinal slide in such lathes. Hitherto in automatic turret lathes the longitudinal slide which carries the tools is generally driven by means of a cam drum. As a rule such cam drums have a relatively large circumference as apart from the working cr , the quick return and the quick advance cams have to be accommodated. This question of size becomes particularly vital when a longitudinal slide is provided with a turret head and has to execute a series of forward and rearward motions during one rotation of the cam drum. In this case a corresponding number of working cams and idling cams have to be provided so that the cam drum becomes correspondingly large and heavy.

The present invention relates to a drive for the longitudinal slide in which the said disadvantage is avoided. The invention resides in that the drive of the longitudinal slide for the working motion is derived from the customary cam drum but the idling movements are effected at an appreciably higher speed by means of a hydraulic gear. This has the advantage that only one feed cam or only a few feed cams have to be provided so that the diameter of the cam drum can be correspondingly small. Moreover, the machine is simplified. Due to the smallness of the drum, it is also more readily possible to keep available for any frequently occurring series of operations a cam drum equipped with a corresponding set of cams and to mount the appropriate cam drum on the lathe as required. It should also be mentioned that the working cams which are retained are comparatively simple in form, whereas the quick return and quick advance cams which are dispensed with are costly, due to the curved portions which have to be provided in order to obtain a smooth motion of the cam roller. In order to save time before the hydraulic rapid return and after the hydraulic rapid forward motion, in both cases an abrupt or short high speed movement can be provided for the cam drum which on the one hand releases the cam roller from the cam for the high speed return immediately after the working operation is completed, and on the other hand allows the cam roller to come into position as quickly as possible for the commencement of the new working operation after the termination of the idle movement. If both movements were effected at the slow working speed, then a very considerable loss of time would be incurred in the case of a slide with a turret head.

Figure 1:
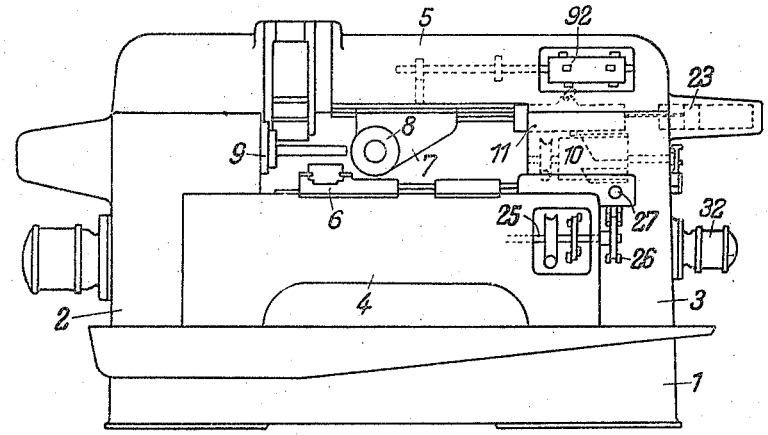
Figure 2:
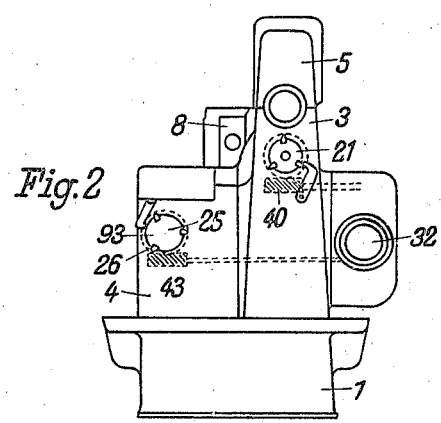
Figures 3, 4:
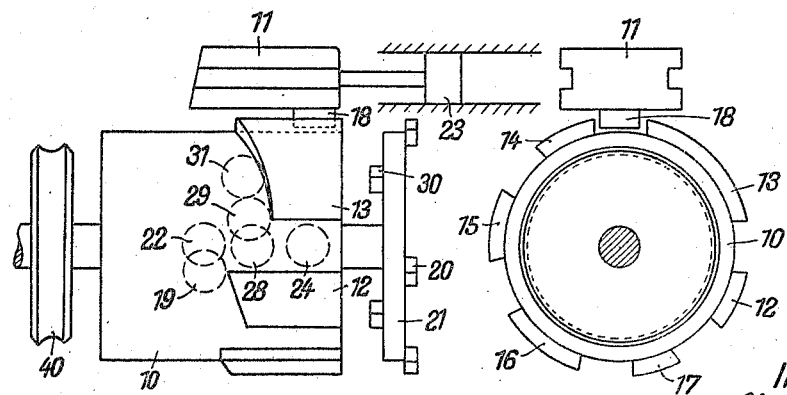
Figure 5:
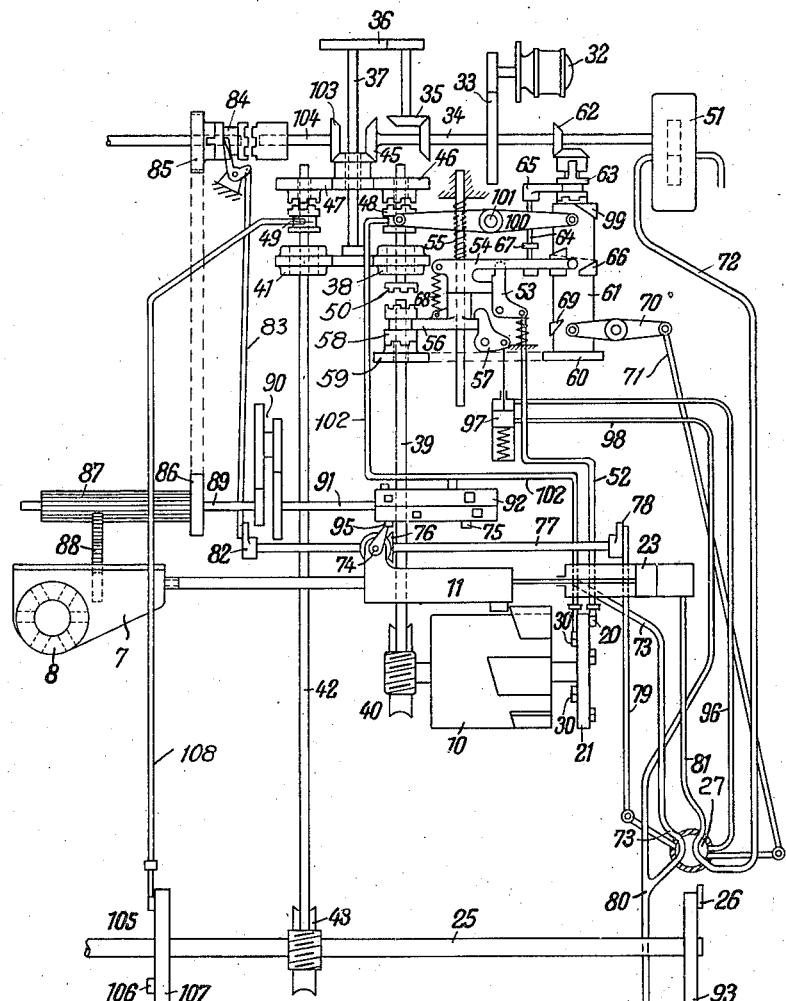

One embodiment of the invention is shown by way of example in the accompanying drawings, in which:

Fig. 1 shows a front elevation of a single spindle automatic lathe,
Fig. 2 is a side view from the right,
Fig. 3 shows the cam drum in side elevation,
Fig. 4 shows an end view of the drum and
Fig. 5 shows diagrammatically the combined mechanical and hydraulic gearing.

As seen from Figs. 1 and 2 the machine is constructed as follows:

Erected at the right and left hand ends of the box base 1 are the standards 2 and 3 which are connected by an intermediate member 4. At the top the two standards are connected by a beam 5 which is disposed towards the rear. The machine is provided with two longitudinal slides 6 and 7, the former being carried on the intermediate member 4 while the slide 7 which is disposed above the slide 6 and carries the turret 8 is suspended from the connecting beam 5. The working spindle 9 is mounted in the left hand standard 2 in which are accommodated the mechanisms for driving the spindle 9 and the lower slide 6. Accommodated in the right hand standard 3 is the cam drum 10 which drives the upper longitudinal slide 7 by way of the intermediate member 11.

The cam drum 10 (Figs. 3 and 4) carries a series of working cams 12 to 17 which serve for advancing the longitudinal slide 7 in the consecutive working operations by means of the cam roller 18 and the intermediate member 11, in accordance with the tool on the turret head 8 which is in working position. In Figs. 3 and 4 the cam roller 18 in the full line position is located between two consecutive cam sections 13 and 14. The cam drum is thus in the interval between two working periods, i. e., the high speed position.

In order to explain the manner in which the longitudinal slide is driven, the position of the cam roller on passing through the cam 12 to the cam 13 (Fig. 3) will be described.

At the end of one working stroke corresponding to the cam 12, the cam roller is in the position 19. At this moment one of the adjustable lugs 20 on the disc 21 connected with the cam occasions an abrupt advance as explained below, whereby the drum is brought into a position relative to the cam roller 18 as indicated by 22; this is the position for the high speed motion. The drum is now stationary and the piston 23 rapidly retracts the intermediate member 11 to which it is attached, together with the longitudinal slide 7. A stop device which will be described subsequently then switches off the hydraulic gearing at the desired moment. In this way the cam roller 18 takes up the position 24. By means of a control shaft 25 and lug 26 (Figs. 1 and 2) the control valve 27 is then actuated, whereby the slide 7 is again advanced hydraulically. A stop device described below then switches off the hydraulic gearing so as to cause the cam roller 18 to assume the position 28 (Fig. 3). Simultaneously with this switching off of the hydraulic gearing, a mechanical high speed movement of the drum is initiated. Consequently the drum is brought into a position corresponding to the position 29 of the cam roller 18 so that the roller is brought just into engagement with the cam 13. On the further high speed rotation of the drum one of the adjustable lugs 30 on the disc 21 cuts out the high speed movement, whereupon the drum continues to rotate from the position 31 of the cam roller at the working speed.

The manner in which the mechanical and hydraulic gears co-operate is indicated in Fig. 5. The common drive of the mechanical gearing and hydraulic gearing is derived from the motor 32. The mechanical drive is divided into a slow working movement and a high speed movement. The slow working movement is produced by the following elements:—

From the motor 32, the drive is transmitted by way of the gear wheels 33, shaft 34 and bevel gear wheels 35 to the change wheels 36 by means of which the working speed is adjusted. From the change wheels 36, the drive is transmitted by way of shaft 37 over a free wheel or uni-directional coupling 38, releasable coupling 50, worm shaft 39 and worm wheel 40 to the cam drum 10 and disc 21. Also the control shaft 25 is driven from the change wheels 36 by way of shaft 37, free wheel or uni-directional coupling 41, worm shaft 42 and worm gear 43.

The mechanical high speed motion is obtained in the following way. From the motor 32, the drive is transmitted to the coupling wheels 46 and 47 by way of gear wheels 33, shaft 34 and bevel gears 45. When the couplings 48 and 49 are engaged, the high speed drive is imparted on the one hand to the cam drum 10 and on the other hand to the control shaft 25. This high speed motion is possible by over-running the free wheel couplings 38 and 41. It should be mentioned that during the high speed drive of the cam drum 10 the coupling 50 is also engaged. The hydraulic drive is derived from the pump 51 which is driven by the shaft 34.

At the end of the working movement of the drum 10 there is, as previously mentioned, an abrupt advance of the drum corresponding to a relative change in position of the cam roller 18 from 19 to 22 (Fig. 3). This movement is obtained as follows: As soon as the drum 10 has assumed the position 19 with respect to the cam roller 18, then the lug 20 on the disc 21 actuates a linkage 52 (Fig. 5). In this way the detent lever 53 is moved downwardly against the action of a spring. The member 54 which was supported by a shoulder on the detent lever 53 is thus released and by means of the spring 55 is urged downwardly into the position shown in Fig. 5. At the same time the member 56 disposed beneath it is also moved downwardly. The lower member 56 is retained in this position by means of a catch 57. The member 56 engages the double sided coupling sleeve 58 whereby owing to the downward movement of the coupling the drive of the cam drum 10 is broken at the coupling 50 and the rapid advance is occasioned by way of coupling wheel 59 under the control of the roller 61 in the following way:

A driving connection is provided between the coupling wheel 59 and the wheel 60 which is rigidly connected with the control roller 61 which is driven from the shaft 34 by way of the bevel gears 62 and the clutch 63. For each abrupt movement of the cam drum 10 there is one rotation of the control roller 61, whereupon the roller automatically comes to rest. The rotation of the control roller 61 is initiated by the downward movement of the member 54, whereby the clutch 63 is engaged by means of a rod 64 and arm 65. By the rotation of the control roller 61 the cam drum 10 is rotated at high speed by way of gear wheels 60 and 59, shaft 39 and worm gearing 40 until the roller 18 moves from position 19 to position 22. Towards the end of this movement of the control roller 61, the member 54 is lifted again against the action of the spring 55 and spring 68 by means of the cam 66. Before the completion of one rotation of the control roller 61 the member 54 engages the collar 67 on the shaft 64 and releases the clutch 63 by way of arm 65, so that the control roller 61 comes to rest.

The hydraulic high speed return movement corresponding to displacement of the cam roller from 22 to 24 (Fig. 3) is initiated during the operation of the control roller 61 by means of the cam 69. (Fig. 5.) By way of lever 70 and linkage 71 this cam actuates the rotary valve 27.

Oil under pressure from the pump 51 then takes the following path. It first flows through the conduit 72, through the valve 27 and through the conduit 73 to in front of the piston 23. The oil behind the piston flows through the conduit 81 and valve 27 into the conduit 80. The slide 7 is thus withdrawn to the right. By means of the lug 75 the lever 74 mounted on the intermediate member 11 is rocked to the left. When the lever 74 is rocked, the control shaft 77 is rotated by way of a pair of bevel gears 76. The control shaft 77 then performs two functions. On the one hand, it actuates the rotary valve 27 by way of lever 78 and linkage 79. The oil under pressure then flows from conduit 72 through valve 27 into the conduit 80 and the high speed retraction of the slide 7 is terminated. On the other hand, the control shaft 77 throws in a clutch 84 by way of lever 82 and linkage 83. This clutch 84 is driven by the bevel gears 103 and shaft 104. The clutch 84 is a single rotation clutch which automatically disengages after one rotation. During this rotation of the clutch 84, the turret head 8 is indexed one step by way of gear wheels 85 and 86, the long indexing drum 87 and the transmission gears 88 by way of a Geneva cross mechanism not shown. At the same time the roller 92 carrying the lugs is also rotated a corresponding amount by means of wheels 87, shaft 89, transmission gearing 90 and shaft 91. Due to this rotation of the roller 92, two new lugs are brought into the path of the lever 74. The various pairs of lugs on the roller 92 are adjusted to limit the hydraulic forward and return motions in accordance with the operations to be performed by the turret head 8.

A lug 26 disposed on the disc 93 (Fig. 5) on the control shaft 25 serves for initiating the hydraulic advance corresponding to the cam roller 18 moving from position 24 to position 28 (Fig. 3). This lug 26 controls the valve 27 so that the oil under pressure passes from the conduit 72 through the valve 27 into the conduit 81 and to the right hand side of the piston 23. Consequently the piston 23 moves to the left and displaces the longitudinal slide 7 into the working position.

The oil in front of the piston escapes through conduit 73 and valve 27 into the conduit 80. Towards the end of the advance of the longitudinal slide, the stop 95 rocks the lever 74 to the right into the position shown in Fig. 5. Thereupon by way of the bevel gear 76, control shaft 77, lever 78 and linkage 79, the rotary valve 27 is so positioned that the pressure liquid operates on an auxiliary piston 97 by way of conduit 72, valve 27 and conduit 96. Consequently the auxiliary piston 97 is urged downwardly against the action of a spring until the oil under pressure passes through conduit 98 into the conduit 80. On depressing the auxiliary piston 97, the catch 57 which is connected thereto releases the member 56. Due to the action of the spring 68, the member 56 is moved upwardly and thus brings the double coupling sleeve 58 into engagement with the coupling 50. In this way the cam drum is driven in the manner previously described and the control roller 61 is released.

In order to obtain the high speed motion of the cam drum from the cam roller position 28 to the cam roller position 31, during the abovementioned single rotation of the control roller 61 the cam 99 rocks the lever 100 about the pin 101 to such an extent as to engage the coupling 48. Thus, as both couplings 48 and 50 are in engagement, the cam drum 10 is rotated at high speed for a period corresponding to the movement of the cam roller from position 28 to position 31. To terminate this brief high speed motion of the cam drum 10 when the cam roller assumes the position 31, the coupling 48 is disengaged again by means of the adjustable lugs 30 on the disc 21 by way of linkage 102. Then the high speed motion of short duration is replaced by the slow working operation.

During the working and high speed motions of the cam drum 10 as portrayed above, the control shaft 25 has rotated only at the working speed. Consequently after a complete rotation of the cam drum the control shaft has still not made a complete rotation. In order to save time the control shaft 25 must complete the rotation at high speed. This is effected by actuating the coupling 49 by means of lugs 105 and 106 on the disc 107 on the control shaft 25 by way of a linkage 108.

All the gear mechanisms described are to be regarded only as examples. The necessary high speed and rapid movements of the tool slide on the one hand and the cam drum on the other hand, as well as the other control movements, could be effected by other means in order to obtain after the working movements of the longitudinal slide as determined by the working cams on the cam drum, the appreciable quicker hydraulic idle movements of the hydraulic as well as the rapid and high speed movements of the cam drum.

Having now particularly described and ascertained the nature of my said invention and in what manner the same is to be performed, I declare that what I claim is:—

1. In an automatic turret lathe means for imparting the working and idling motions to the longitudinal tool slide comprising a roller associated with said slide, a drum carrying cams adapted to engage said roller only for the working motion and to advance the slide slowly during the working motion and liquid-actuated means adapted to operate on said slide when said roller is not operatively engaged by the cam drum and to impart to the slide the high speed retraction and advance of the idling motion.

2. In an automatic turret lathe means for imparting the working and idling motions to the longitudinal tool slide comprising a roller associated with said slide, a drum carrying cams adapted to engage said roller only for the working motion and to advance the slide slowly during the working motion, means for imparting an abrupt movement to the drum at the end of the working motion and a hydraulic gearing adapted to operate on said slide when said roller is not operatively engaged by the cam drum and to impart to the slide the high speed retraction and advance of the idling motion.

3. In an automatic turret lathe means for imparting the working and idling motions to the longitudinal tool slide comprising a roller associated with said slide, a drum carrying cams adapted to engage said roller only for the working motion and to advance the slide slowly during the working motion and a hydraulic gearing adapted to operate on said slide when said roller is not operatively engaged by the cam drum and to impart to the slide the high speed retraction and advance of the idling motion, and means for imparting an abrupt movement to the drum at the end of the high speed advance to bring the cam roller into engagement with a cam for the next working operation.

4. In an automatic turret lathe means for imparting the working and idling motions to the longitudinal tool slide comprising a roller associated with said slide, a drum carrying cams adapted to engage said roller only for the working motion and to advance the slide slowly during the working motion, means for imparting an abrupt movement to the drum at the end of the working motion and a hydraulic gearing adapted to operate on said slide when said roller is not operatively engaged by the cam drum and to impart to the slide the high speed retraction and advance of the idling motion, and means for imparting an abrupt movement to the drum at the end of the high speed advance to bring the cam roller into engagement with a cam for the next working operation.

5. In an automatic turret lathe means for imparting the working and idling motions to the longitudinal tool slide comprising a roller associated with said slide, a drum carrying cams adapted to engage said roller only for the working motion and to advance the slide slowly during the working motion, means for imparting an abrupt rotary movement to the drum at the end of the working motion and a hydraulic gearing adapted to operate on said slide when said roller is not operatively engaged by the cam drum and to impart to the slide the high speed retraction and advance of the idling motion.

6. In an automatic turret lathe means for imparting the working and idling motions to the longitudinal tool slide comprising a roller associated with said slide, a drum carrying cams adapted to engage said roller only for the working motion and to advance the slide slowly during the working motion and a hydraulic gearing adapted to operate on said slide when said roller is not operatively engaged by the cam drum and to impart to the slide the high speed retraction and advance of the idling motion, and means for imparting an abrupt rotary movement to the drum at the end of the high speed advance to bring the cam roller into engagement with a cam for the next working operation.

7. In an automatic turret lathe means for imparting the working and idling motions to the longitudinal tool slide comprising a roller associated with said slide, a drum carrying cams adapted to engage said roller only for the working motion and to advance the slide slowly during the working motion, means for imparting an abrupt rotary movement to the drum at the end of the working motion and a hydraulic gearing adapted to operate on said slide when said roller is not operatively engaged by the cam drum and to impart to the slide the high speed retraction and advance of the idling motion, and means for imparting an abrupt rotary movement to the drum at the end of the high speed advance to bring the cam roller into engagement with a cam for the next working operation.

FRITZ POPPENSIEKER.